US011164681B2

(12) United States Patent
Cohen

(10) Patent No.: US 11,164,681 B2
(45) Date of Patent: Nov. 2, 2021

(54) SYSTEM AND METHOD FOR REDUCING HEAT LOSS FROM FRC BULK PLASMA

(71) Applicant: The Trustees of Princeton University, Princeton, NJ (US)

(72) Inventor: Samuel A. Cohen, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/808,594

(22) Filed: Mar. 4, 2020

(65) Prior Publication Data

US 2020/0357527 A1  Nov. 12, 2020

Related U.S. Application Data

(60) Provisional application No. 62/814,012, filed on Mar. 5, 2019.

(51) Int. Cl.
*G21B 1/13* (2006.01)

(52) U.S. Cl.
CPC ..................... *G21B 1/13* (2013.01)

(58) Field of Classification Search
CPC ............ G21B 1/05; G21B 1/052; G21B 1/13
See application file for complete search history.

(56) References Cited

U.S. PATENT DOCUMENTS

| 9,767,925 B2 | 9/2017 | Cohen | |
| 2018/0047461 A1* | 2/2018 | Cohen | F03H 1/0081 |
| 2019/0035509 A1* | 1/2019 | Tuszewski | G21B 1/15 |

OTHER PUBLICATIONS

Eugene S. Evans, Samuel A. Cohen, and Dale R. Welch: "Particle-in-cell studies of fast-ion slowing-down rates in cool tenuous magnetized plasma", Physics of Plasmas 25, 042105 (2018); doi: 10.1063/1.5022188.

* cited by examiner

*Primary Examiner* — Jack W Keith
*Assistant Examiner* — Joshua C Devorkin
(74) *Attorney, Agent, or Firm* — Meagher Emanuel Laks Golberg & Liao, LLP

(57) ABSTRACT

According to various embodiments, an FRC fusion reactor is disclosed. The FRC fusion reactor includes a main chamber containing an FRC core and an energy and ash removal shell (EARS). The FRC fusion reactor further includes at least one divertor chamber connected to the main chamber via a divertor throat. The divertor chamber includes a plasma extruder positioned on a major axis of the FRC fusion reactor and a controllable distance along the major axis from the divertor throat. The plasma extruder has a diameter approximately ½ a diameter of the divertor throat and is configured to block plasma flow towards the FRC core to create a gap region between the FRC core and the EARS.

20 Claims, 4 Drawing Sheets

Figure of Revolution about Major Axis

SYSTEM AND METHOD FOR REDUCING HEAT LOSS FROM FRC BULK PLASMA

CROSS-REFERENCE TO RELATED APPLICATIONS

This application claims priority to provisional application 62/814,012, filed Mar. 5, 2019, which is herein incorporated by reference in its entirety.

STATEMENT REGARDING FEDERALLY SPONSORED RESEARCH OR DEVELOPMENT

This invention was made with government support under Grant No. DE-AC02-09CH11466 awarded by the Department of Energy. The government has certain rights in the invention.

FIELD OF THE INVENTION

The present invention relates generally to fusion reactors and, more particularly, to a system and method to reduce heat and particle loss from bulk plasma in a field reversed configuration (FRC) fusion reactor.

BACKGROUND OF THE INVENTION

A field reversed configuration (FRC) fusion reactor produces energy through the process of thermonuclear fusion in a Field Reversed Configuration of plasma. Thermonuclear fusion can occur in plasma composed of many fuels. The fuel which requires the lowest ion temperature to produce significant amounts of fusion is a mixture of deuterium and tritium. Other fuel mixtures, e.g., deuterium alone, a mixture of deuterium and helium-3, and a mixture of hydrogen and boron-11, require higher temperatures but produce fewer neutrons, hence less radioactivity and less material damage. Fusion requires that threshold values of temperature and density of plasma are met. Typical temperature ranges for magnetic fusion reactors are 10 keV-300 keV, and typical plasma densities are $10^{20}$ particles per cubic meter to $10^{23}$ particles per cubic meter.

The plasma in a Field Reversed Configuration is confined by magnetic fields. These magnetic fields can be generated by steady-state superconducting or normal-conducting coils, as nonlimiting examples, as well as currents in the plasma itself. The plasma in an FRC must be heated to fusion-relevant temperatures. The heating can be accomplished by radiofrequency power including rotating magnetic fields, microwave power, neutral beam injection, or magnetic compression. Various processes within the plasma cause the leakage of energy out of the FRC. To maintain fusion-relevant temperatures, the heating power and the portion of fusion power absorbed by the plasma must balance the energy loss. The plasma confined in an FRC requires current in the FRC's plasma. The current required in an FRC can be accomplished by rotating magnetic fields, neutral beam injection, or the merging of other plasma configurations.

An FRC fusion reactor may do useful work with the energy produced from fusion such as, but not limited to, the direct generation of neutrons for neutron imaging or medical isotope production, the generation of thrust or electrical power for in-space rocket applications, the generation of high-grade heat for industrial processes, or the generation of electricity.

A concern with an FRC fusion reactor is the exhaust of fusion ash and fusion power from the fusion reactor. The exhaust of fusion ash is required to avoid quenching the fusion reaction by diluting the plasma with non-reactive species and also to reduce neutron production that might occur by ash nuclei interacting with the fusion fuel. The exhaust of fusion power is required to extract the energy produced by fusion for conversion to a form, such as electrical power, that can provide useful work.

Previous U.S. Pat. No. 9,767,925 described a new way to extract energy and ash from small FRC fusion reactors, ones in which the fusion products' gyro-radii were comparable to the FRC's radial size. Under this condition, most fusion products created in the core plasma would pass through the separatrix into the cool SOL, rapidly slow down there, depositing the majority of their energy in the SOL. Eventually their orbits would fully lie within the SOL, on its open field lines, allowing the fusion ash to be exhausted and the power to be extracted.

The problem with this approach is that the cool SOL would also extract energy from fuel ions inside the core plasma. These ions, many with energy >100 keV, would have large enough gyro-radii to allow them to pass through the SOL. Detrimental core cooling would occur, lowering the core plasma's energy confinement. Another problem with this approach is that turbulence may occur in the SOL and propagate into the core and cause plasma loss and cooling.

As such, there is a need for an approach to exhaust fusion ash and extract fusion power without at least the above limitations.

SUMMARY OF THE INVENTION

According to various embodiments, an FRC fusion reactor is disclosed. The FRC fusion reactor includes a main chamber containing an FRC core and an energy and ash removal shell (EARS). The FRC fusion reactor further includes at least one divertor chamber connected to the main chamber via a divertor throat. The divertor chamber includes a plasma extruder positioned on a major axis of the FRC fusion reactor and a controllable distance along the major axis from the divertor throat. The plasma extruder has a diameter approximately ½ a diameter of the divertor throat and is configured to block plasma flow towards the FRC core to create a gap region between the FRC core and the EARS.

According to various embodiments, a method of operating an FRC fusion reactor is disclosed. The FRC fusion reactor has a main chamber containing an FRC core and an energy and ash removal shell (EARS) and at least one divertor chamber connected to the main chamber via a divertor throat. The method includes positioning a plasma extruder on a major axis of the FRC fusion reactor. The plasma extruder has a diameter approximately ½ a diameter of the divertor throat. The method further includes controlling a distance along the major axis of the plasma extruder from the divertor throat to block plasma flow towards the FRC core to create a gap region between the FRC core and the EARS.

According to various embodiments, an FRC fusion reactor is disclosed. The FRC fusion reactor includes a main chamber containing an FRC core and an energy and ash removal shell (EARS). The FRC fusion reactor further includes a first divertor chamber connected to the main chamber via a first divertor throat. The first divertor chamber includes a first plasma extruder positioned on a major axis of the FRC fusion reactor and a controllable distance along the major axis from the divertor throat. The first plasma extruder has a diameter approximately ½ a diameter of the first divertor throat and is configured to block plasma flow towards the FRC core to create a gap region between the FRC core and the EARS. The FRC fusion reactor additionally includes a second divertor chamber connected to the main chamber via a second divertor throat. The second divertor chamber includes a second plasma extruder positioned on the major axis and a controllable distance along the major axis from the divertor throat. The second plasma extruder includes a diameter approximately ½ a diameter of the second divertor throat and is configured to block backflow plasma being near the FRC core.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Embodiments generally disclosed herein depict a system and method to reduce heat and particle loss from bulk plasma of a field reversed configuration (FRC) fusion reactor. More particularly, embodiments disclosed herein depict a system and method to reduce the loss of ion energy and fuel ions from the bulk plasma in an FRC fusion reactor. In an FRC fusion reactor, embodiments of the disclosed approach will allow higher sustained core plasma ion temperatures and densities, higher fusion rates, increased power generation, and a larger ratio of fusion power output to power input into the reactor.

Figure 1:
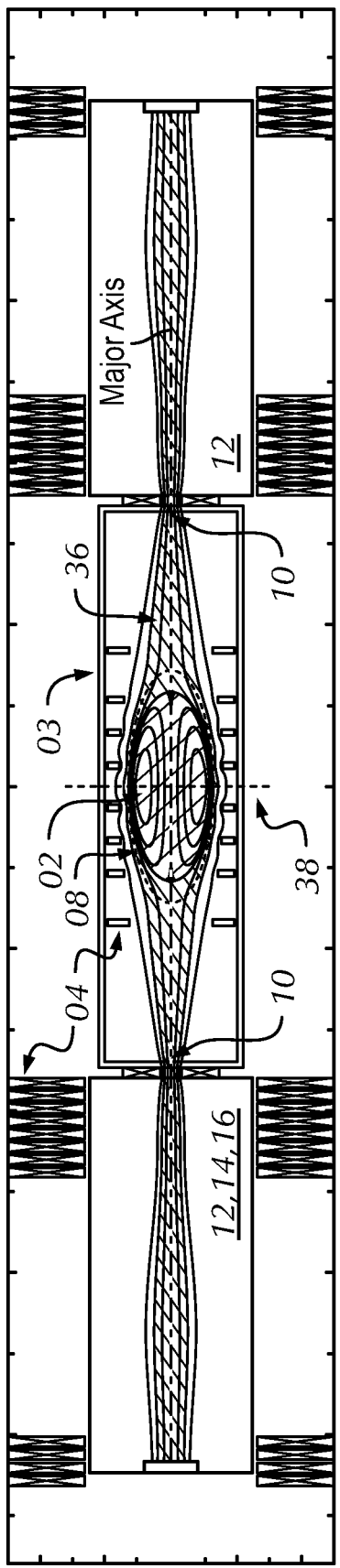
FIG. 1 depicts a schematic diagram of an FRC reactor without a plasma extruder according to an embodiment of the present invention.

The FRC fusion reactor to which the present invention applies is an FRC fusion reactor with a densified scrape off layer (SOL), such as the ones described U.S. Patent Application Publication No. 2018/0047461 and U.S. Pat. No. 9,767,925, which are both herein incorporated by reference in their entirety. FIG. 1 depicts a schematic diagram of such an FRC reactor with a SOL 36.

The FRC fusion reactor includes an FRC core 02 that produces energy through thermonuclear fusion. The FRC core 02, in which magnetic field lines close in loops, confines the hot plasma composed of fusion fuel. As nonlimiting examples, the three most commonly described fusion fuels are: a) the hydrogen isotopes of deuterium and tritium, b) deuterium and the helium isotope of helium-3, and c) the hydrogen isotope of proton and the boron isotope of boron-11. Thermonuclear fusion spontaneously occurs in plasma that is hot and dense enough, where the thresholds for heat and density are set by the specific choice of fuel. For a deuterium and tritium plasma, as a nonlimiting example, the temperature and density required for a fusion reactor are generally held to be 10 keV and $10^{21}/m^3$, respectively. Other thresholds for other choices of fuel would be understood by those skilled in the art.

The FRC fusion reactor further includes axial field magnets 04 co-axial with the main chamber 03 for confining the plasma in the FRC core 02. An FRC made of plasma does not hold itself together. It must be contained by magnetic fields, some provided by coaxial magnetic coils 04. A magnetic field is produced by the axial field magnets 04 in addition to strong currents on the plasma. The axial magnetic field magnets 04 may be made of NbTi, Nb3Sn, or other low-temperature superconductors, YCBO or other high-temperature superconductors, or normal conductors, as nonlimiting examples.

The imaginary surface which separates the FRC core 02 and the SOL 36 is called the separatrix 08. The defining feature of the separatrix is that it separates the region in which the field lines close on each other inside the reactor and the region where the field lines impact the reactors inner walls. Particles in the FRC core 02 are confined within the core for a long time, typically 10-100 seconds. Particles outside the separatrix 08 in the SOL 36 are free to flow through one or more divertor throats 10, typically in less than one millisecond.

The divertor throats 10 are made of a vacuum-compatible material resistant to heat and sputtering by small atoms. Typical nonlimiting examples of materials for the divertor throats are: tungsten, tantalum, graphite, molybdenum, and ceramic. For some applications of this fusion reactor, e.g., as a rocket engine, one of the divertor throats may be called a nozzle, in analogy with the thrust-generating nozzles of chemical rocket engines.

The main chamber 03 is a cylindrically symmetric vacuum chamber which contains the FRC core 02. The main chamber 03 is made of a vacuum-compatible material resistant to heat flux such as stainless steel or ceramic as nonlimiting examples.

In the present embodiment of an FRC fusion reactor, the SOL 36 is free to flow through the divertor throats 10 into one or both of the divertor chambers 12. The divertor chambers 12 is made of a vacuum-compatible material resistant to heat flux such as stainless steel or ceramic as nonlimiting examples. One divertor chamber, the gas box 14, maintains a population of neutral gas 16 through gas injection into it. The gas may be injected using a piezoelectric valve as a nonlimiting example. The purpose of this gas is to increase and sustain the density the SOL 36 plasma. The gas 16 is composed of an easily ionizable light gas such as hydrogen, deuterium, helium, lithium, or neon, as nonlimiting examples. The reason the SOL 36 is densified is to exhaust fusion products from the FRC core 02 and to control the temperature of the SOL 36 to that needed for each application. The temperature is controlled by controlling the flow of gas 16. The flow of gas may be controlled by controlling the voltage on a piezoelectric valve, as a nonlimiting example. A higher flow cools the SOL 36 while a lower flow allows the SOL 36 to remain hot. Vacuum pumps of a variety of types may be in one or both divertor chambers to remove unwanted gas.

The mainline fusion reactor designs, e.g., tokamaks, rely on the SOL being populated by particles and energy that leave their plasma core and cross their separatrices via a diffusive process with convection across the separatrix possibly also contributing. For small FRCs, a method for extracting the energy directly from the fusion products while also removing them promoted the passage of the large gyro-radii (typically about 5 cm) 32 fusion product ions through a cool dense SOL 36. In previously described small FRC reactor plasma configurations, the SOL plasma 36 is formed of gas 16 injected into the gas-box divertor 14. The energy required to ionize that gas arrives into that divertor primarily via electron thermal conduction along the SOL 36. The cool plasma thus formed in the gas-box divertor 14 flows out of the gas-box divertor 14 through the divertor "throat" 10 as a cylindrical SOL 36 stream with a slowly varying spatial cross section in the axial direction. As the stream approaches the FRC core 02, at the FRC's x-points, its shape changes to a hollow pipe with the pipe's inner surface in contact with the FRC's separatrix 08. The divertor throat diameter 26, in conjunction with the magnetic fields of the FRC plasma core 02 and the axial magnets 04, determine the SOL 36 width (thickness), usually measured by its value at the FRC midplane 38. The SOL 36 thickness is typically expected to be about 0.5-2 cm. The fusion products pass through the SOL 36 which is outside of and typically touching the separatrix 08. The fusion products reduce speed in the cool SOL 36 and, in that process, heat the SOL plasma 36; simultaneously, the fusion product trajectories migrate into the SOL 36, by an airbrake-like process, until they are transported along the SOL 36 into a divertor chamber 12. Rapid exhaust of fusion products is essential to the operation of steady-state fusion reactors.

As seen in FIG. 1, the SOL 36 extends from one divertor 12 to the other divertor 12. At the separatrix 08, the SOL 36 is in intimate contact with the hot FRC core 02. This contact has the drawback of cooling and exhausting the bulk plasma ions—the fuel ions—that pass through the SOL 36 because their moderate-sized gyro-radii 34, typically 1 cm, allows them to traverse the separatrix 08 by 1 cm. Fuel-ion cooling near the separatrix is undesirable because it will lead to cooling of the core ions and a decrease in fusion rate in the core. Similarly, loss of fuel ions is undesirable because it will reduce the fusion power output and remove valuable fuel ions from the core. Another problem with this method is that turbulence may occur in the SOL 36 and propagate into the core 02, which leads to plasma particle and energy loss.

Figure 2:
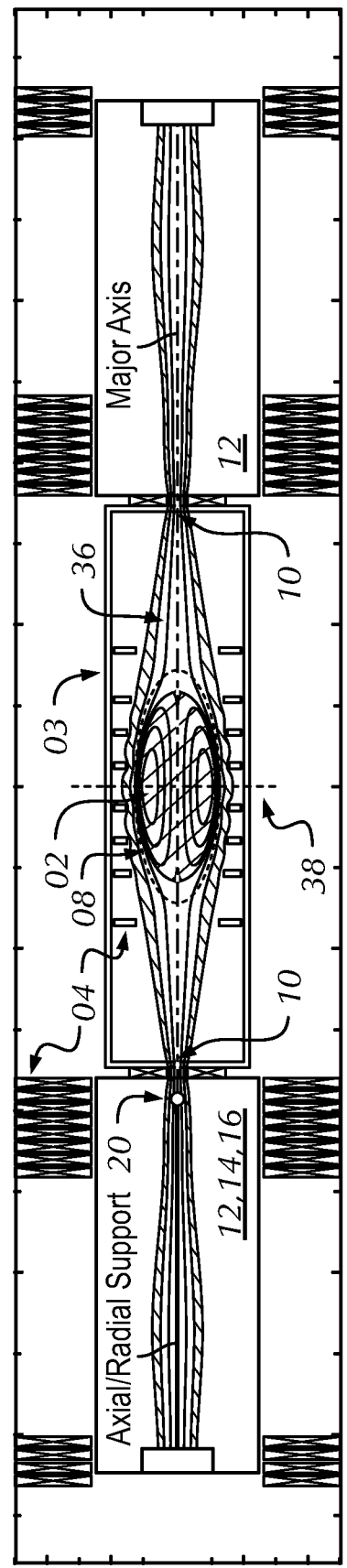
FIG. 2 depicts a schematic diagram of an FRC reactor with a plasma extruder according to an embodiment of the present invention.
Figure 3:
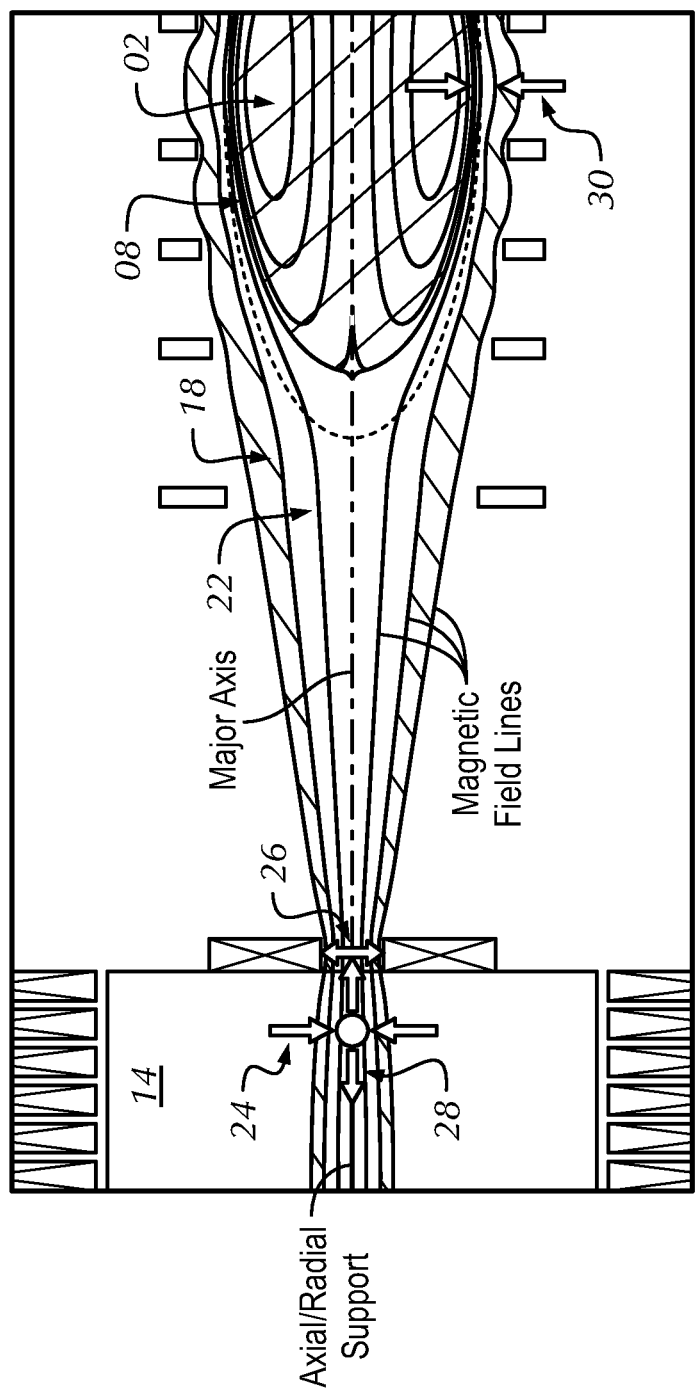
FIG. 3 depicts a schematic diagram of a plasma extruder in an FRC reactor according to an embodiment of the present invention.

As such, embodiments of the disclosed approach require a modification at least one of the divertor chambers 12 of an FRC fusion reactor. As depicted in FIGS. 2-3, the disclosed approach changes the SOL plasma shape to be pipe-like, having a "hole" 22 throughout its bore, as it exits the divertor throat. This new configuration of cold plasma is referred to herein as the Energy and Ash Removal Shell 18 (EARS). The EARS 18 maintains that hole 22 along the entire length of the FRC reactor. Moreover, at every axial position, the inner diameter 24 of the EARS 18 is larger than the diameter of the FRC separatrix 08 at the same axial position. This will result in a cm-scale gap 22 immediately outside the FRC separatrix 08. Upstream and downstream of the FRC core 02, the "hole" 22 has a circular cross section. Around the FRC core 02, the hole 22 has annular cross section and its inner diameter is the separatrix 08. This region around the FRC core 02 is called the gap 22.

In this gap 22, the plasma density will be very low, near zero. The low or zero plasma density in the gap 22 around the FRC 02 is what reduces or fully eliminates cooling of the bulk fuel ions because the fuel ion gyro-radii 34 are too short to extend beyond the gap 22. Radially outside this gap 22, the EARS 18 plasma density will be high, fed from plasma formed by ionization in the gas box 14. The MeV fusion ash ions have larger gyro-radii 32 than the fuel ions 34 and hence will reach this cool, dense EARS and be cooled and extracted there.

The plasma density is very low or zero in the gap 22 because the source of plasma from the gas box 14 on the field lines will be interrupted by an object 20 that creates the "hole". This object may be referred to as a plasma extruder 20. The gap 22 will be formed by the placement of the plasma extruder object 20 in the divertor region, co-axial with the FRC's major axis and at a controllable distance from the divertor throat 10, fully or partially inside the throat 10. The distance from the divertor throat can be controlled to change the width of the gap 22, allowing a thicker or thinner gap 22 as the correct thickness to exhaust ash but not fuel is determined. The plasma extruder 20 is made of a heat and sputter-resistant material and can be shaped as a cone, disc, cylinder, or sphere or the combination of these and other shapes. A cone receives uniformly low heat flux but the tip has poor thermal contact with the bulk material for cooling. A disc receives high heat flux but the entire surface has good thermal contact with the bulk material. The other nonlimiting example shapes have different tradeoffs understood by those skilled in the art between these parameters and gas escaping from the divertor box towards the FRC core.

The plasma extruder 20 may be conducting or insulating, depending on the plasma performance. The support and position of the plasma extruder 20 maybe be through axial or radial or combined structures. The distance of the plasma extruder 20 may be controlled by changing the axial position of the support structures through linear actuators embedded in the divertor throat or the divertor end, as a nonlimiting examples. The plasma extruder material may be tungsten, tantalum, molybdenum, or ceramic, as nonlimiting examples.

FIG. 2, and a closeup in FIG. 3, depict a schematic diagram an FRC reactor with a plasma extruder 20, shown here as a sphere. The diameter 24 of the sphere 20 (or of the cone, disc, or cylinder in other embodiments) should be approximately ½ the diameter 26 of the divertor throat opening 10 and lie on the FRC major axis. The upstream side, that not facing the FRC core, of the sphere 20 will block plasma flow towards the FRC core 02, plasma that otherwise would contact the FRC's separatrix 08. The gap 22 is formed by this means. FIG. 2 shows the gap 22 as the region between the separatrix 08 and the EARS 18. The EARS 18 plasma width in the FRC is now set by the diameter of the divertor throat 10 and the size, shape, and placement of the plasma extruder 20, as well as the FRC core 02 and axial coil 04 magnetic fields.

FIGS. 2 and 3 show that the EARS 18 dense cool plasma now does not contact the separatrix 08. The EARS 18 density in that region will still be created of gas 16 fed into the gas box 14 and ionized there. Without plasma in the 1-2 cm gap 22 near the FRC separatrix 08, the 1-cm gyro-radii fuel ions 34 will not be slowed down or exhausted even though they pass through the separatrix 08 because these ions have insufficiently large gyro-radii to traverse the entire gap 22 and enter the cool dense plasma 18. The gap 22, being 1-2 cm, will still be small enough that ash ions 32 can reach the cool dense EARS 18 plasma, transferring their energy to the EARS 18 plasma and eventually be extracted from the core 02 in that process. Extraction occurs when the trajectory of the ash ion 32 passes entirely within the EARS, which occurs spontaneously. These ions then flow along the EARS into the divertor chambers.

The plasma extruder 20 also reduces the transport of neutral gas 16 from the gas box 14 into the region occupied by the FRC core 02, the main chamber 03. It is important to have low neutral density in the main chamber 03 to reduce energy and current losses, primarily by charge exchange. Thus, the plasma extruder 20 can further reduce energy losses from the fuel ions.

The plasma extruder 20 also reduces the level of turbulence in the FRC core 02. Instabilities may cause fluctuations in the SOL 36 of an FRC fusion reactor. These fluctuations may propagate to the FRC core 02 and cause loss of particles and energy. The gap 22 helps prevent fluctuations in the EARS 18 from propagating to the FRC core 02.

Figure 5:
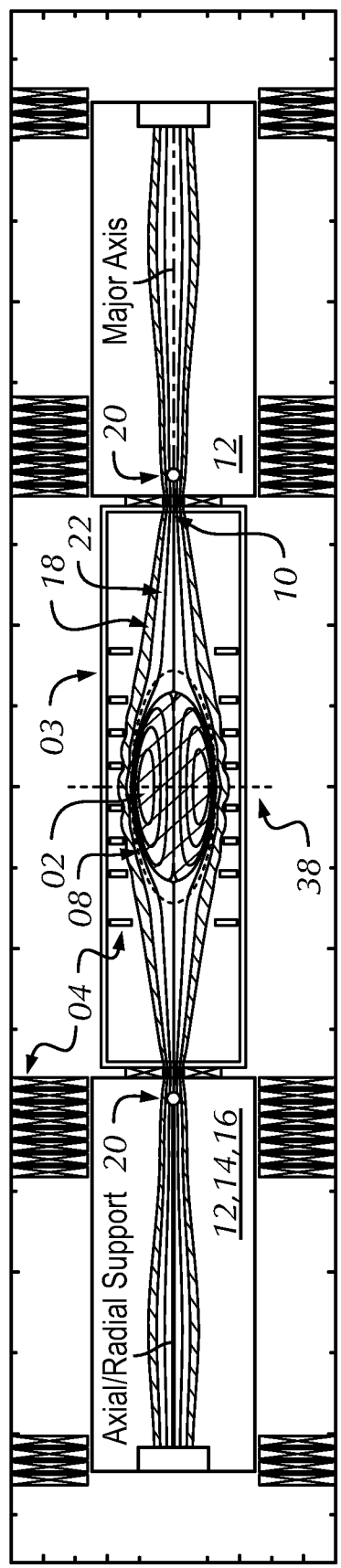
FIG. 5 depicts a schematic diagram of an FRC reactor with two plasma extruders according to another embodiment of the present invention.

A second plasma extruder 20 may be placed in a second divertor chamber 12, also to prevent backflow plasma from being close to or contacting the separatrix 08. This is depicted in FIG. 5. The second plasma extruder also reduces the neutral gas backflow from the second divertor chamber 12 into the main chamber 03. This second plasma extruder would have most use when the second divertor 12 neutral pressure is comparable to that in the primary divertor chamber 14.

Figure 4:
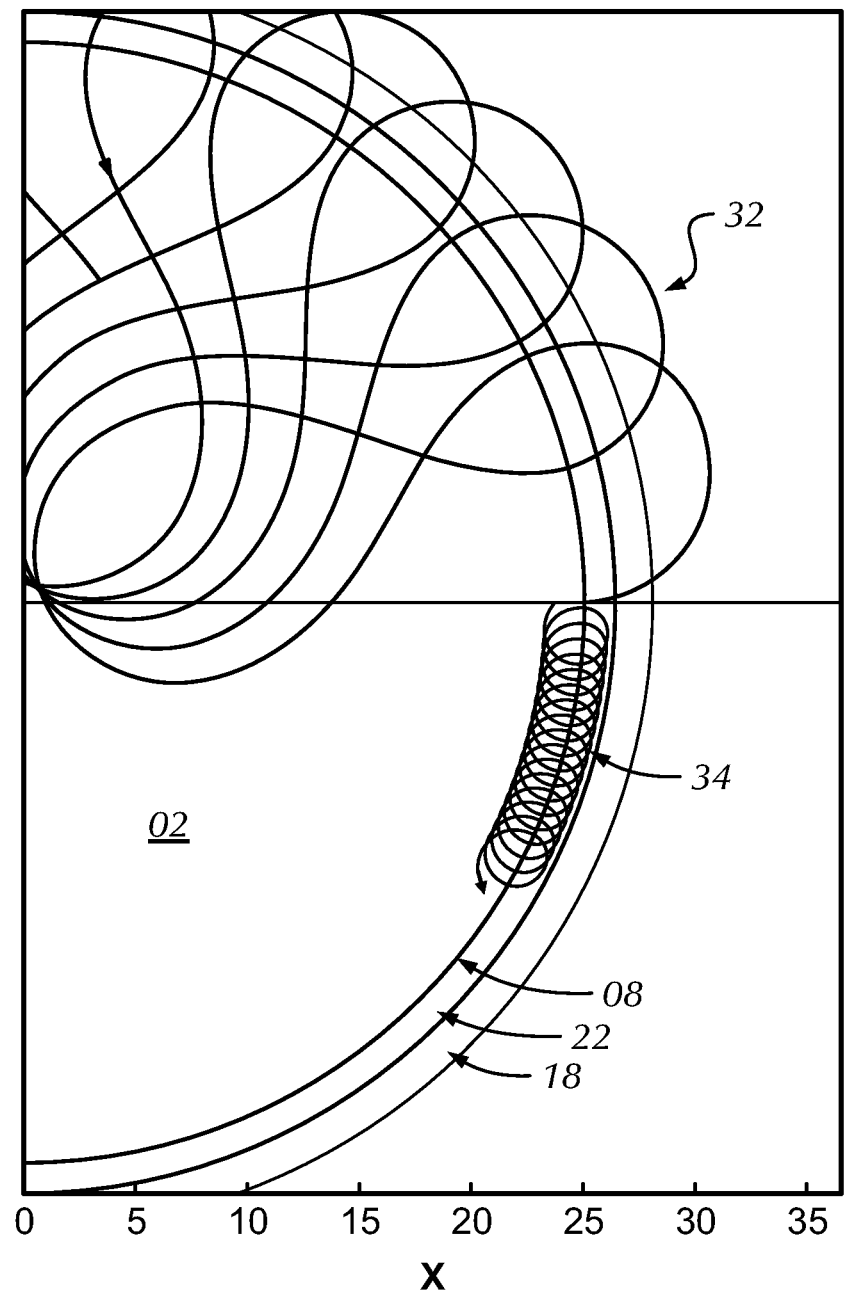
FIG. 4 depicts a graph of sample trajectories of a 100 keV fuel ion 34 ($D^+$) and 2 MeV fusion product ion 32 ($He4^{++}$) in a 25-cm-radius, 5-T FRC reactor according to an embodiment of the present invention.

FIG. 4 depicts sample trajectories, projected on the FRC's midplane 38 cross section, of a 100 keV fuel ion ($D^+$) 34 and 2 MeV fusion product ion ($He4^{++}$) 32 in a 25-cm-radius, 5-T FRC 02. A gap 22 with low plasma density, created by plasma extruders 20, exists between the separatrix 08 and the cool, dense EARS 18. Fuel-ion trajectories 34 are cyclotron shaped and orbit near the separatrix 08. The gyro radii of fuel ions 34 are not large enough to transit the gap 22, hence these fuel ions cannot reach the cool, dense EARS plasma 18. The more energetic fusion-product ions 32 are more likely to be in betatron orbits. Their gyro-radii 32 are large enough to traverse the gap 22. These ions then can enter the EARS 18, be cooled and extracted there. The gap size 30 can be controlled by changes in the plasma extruder's 18 size 24 or axial position 28.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A field reversed configuration (FRC) fusion reactor, comprising:
    a main chamber containing an FRC core and an energy and ash removal shell (EARS), the FRC core comprising fuel and ash; and
    at least one divertor chamber connected to the main chamber via a divertor throat, the divertor chamber comprising a solid plasma extruder object suspended inside the divertor chamber, the solid plasma extruder object being positioned on a major axis of the FRC fusion reactor and a distance along the major axis from the divertor throat such that the ash but not the fuel is exhausted, the solid plasma extruder object configured to block plasma flow towards the FRC core to create a gap region between the FRC core and the EARS.

2. The FRC fusion reactor of claim 1, wherein the solid plasma extruder object is made of heat- and sputter-resistant material.

3. The FRC fusion reactor of claim 1, wherein the solid plasma extruder object is at least one of a conical, spherical, and cylindrical shape.

4. The FRC fusion reactor of claim 1, further comprising a plurality of axial field magnets.

5. The FRC fusion reactor of claim 1, wherein the divertor chamber is a gas box containing neutral gas and plasma.

6. The FRC fusion reactor of claim 5, wherein the solid plasma extruder object is further configured to reduce neutral gas flow from the divertor chamber into the main chamber.

7. A method of operating a field reversed configuration (FRC) fusion reactor, the FRC fusion reactor having a main chamber containing an FRC core and an energy and ash removal shell (EARS), the FRC core containing fuel and ash, and at least one divertor chamber connected to the main chamber via a divertor throat, the divertor chamber having a solid plasma extruder object suspended inside the divertor chamber, the method comprising:
    positioning the solid plasma extruder object on a major axis of the FRC fusion reactor and a distance along the major axis from the divertor throat such that the ash but not the fuel is exhausted; and
    blocking plasma flow towards the FRC core via the solid plasma extruder object to create a gap region between the FRC core and the EARS.

8. The method of claim 7, wherein the solid plasma extruder object is made of heat- and sputter-resistant material.

9. The method of claim 7, wherein the solid plasma extruder object is at least one of a conical, spherical, and cylindrical shape.

10. A field reversed configuration (FRC) fusion reactor, comprising:
    a main chamber containing an FRC core and an energy and ash removal shell (EARS), the FRC core comprising fuel and ash;
    a first divertor chamber connected to the main chamber via a first divertor throat, the first divertor chamber comprising a first solid plasma extruder object suspended inside the first divertor chamber, the first solid plasma extruder object being positioned on a major axis of the FRC fusion reactor and a distance along the major axis from the divertor throat such that the ash but not the fuel is exhausted, the first solid plasma extruder object configured to block plasma flow towards the FRC core to create a gap region between the FRC core and the EARS; and
    a second divertor chamber connected to the main chamber via a second divertor throat, the second divertor chamber comprising a second solid plasma extruder object suspended inside the second divertor chamber, the second solid plasma extruder object being positioned on the major axis and a distance along the major axis from the divertor throat, the second solid plasma extruder object configured to block backflow plasma being near the FRC core.

11. The FRC fusion reactor of claim 10, wherein the first solid plasma extruder object and the second solid plasma extruder object are made of heat- and sputter-resistant material.

12. The FRC fusion reactor of claim 10, wherein the first solid plasma extruder object and second solid plasma extruder object are each at least one of a conical, spherical, and cylindrical shape.

13. The FRC fusion reactor of claim 10, wherein the first divertor chamber is a gas box containing neutral gas and plasma.

14. The FRC fusion reactor of claim 13, wherein the first solid plasma extruder object is further configured to reduce neutral gas flow from the first divertor chamber into the main chamber.

15. The FRC fusion reactor of claim 1, further comprising at least one of axial and radial structures to support and position the solid plasma extruder object.

16. The FRC fusion reactor of claim 15, wherein the axial and radial structures further comprise at least one linear actuator to control the distance of the solid plasma extruder object.

17. The FRC fusion reactor of claim 1, wherein a material of the solid plasma extruder object comprises at least one of tungsten, tantalum, molybdenum, and ceramic.

18. The FRC fusion reactor of claim 10, further comprising at least one of axial and radial structures to support and position the first solid plasma extruder object and the second solid plasma extruder object.

19. The FRC fusion reactor of claim 18, wherein the axial and radial structures further comprise at least one linear actuator to control the distance of the first solid plasma extruder object and second solid plasma extruder object.

20. The FRC fusion reactor of claim 1, wherein a material of the first solid plasma extruder object and a material of the second solid plasma extruder object each comprise at least one of tungsten, tantalum, molybdenum, and ceramic.

\* \* \* \* \*